UNITED STATES PATENT OFFICE.

JOHANNES REITZ, OF SCHMARGENDORF, NEAR BERLIN, GERMANY, ASSIGNOR TO THE FIRM OF PAUL SIMON, OF PLAUEN, GERMANY.

RADIUM COMPOUND AND PROCESS OF MAKING SAME.

No. 920,881.        Specification of Letters Patent.        Patented May 4, 1909.

Application filed September 20, 1907. Serial No. 393,862.

*To all whom it may concern:*

Be it known that I, JOHANNES REITZ, a subject of the King of Prussia, German Emperor, and resident of 10 Warnemünderstrasse, Schmargendorf, near Berlin, German Empire, have invented certain new and useful Improvements in the Preparation of a Novel Radio-Active Crystal, of which the following is an exact specification.

My invention relates to the preparation of an improved and novel permanent combination of a radio-active salt in the form of a dense crystalline mass.

It has already been proposed to precipitate radium in solution with another substance, but in this case the resulting product was a granular mass which soon lost its radio active qualities or these became so faint as to become useless for application for medical and other purposes. This was principally due to the fact, that the proportions of neither the carrying substance nor the radium could be controlled in a mere precipitation.

The object of the present invention is to produce an improved and novel combination of a radium compound by means of which the proportions of the radium and the crystalline mass binding said medium can be determined with accuracy beforehand. According to the present invention a suitable carrying salt is first calcined or deprived of its crystalline water or of as much of its crystalline water as desired and this crystalline water is substituted by an aqueous solution of a radium compound. The resulting product therefore is a radio-active crystal having a crystallizing salt and an aqueous solution of a radium compound forming all or a part of the crystallizing water.

The invention is carried out as follows:— In the first place an aqueous solution of a radium compound is produced. Then a crystallizing substance is taken, of which the water contained therein is expelled by a prior proceeding, such as calcination for instance, whereby the crystallizing substance is reduced to a friable state or a powder. A certain quantity of this powder is taken and mixed with a certain quantity of the radium-compound solution, the proportion of the two ingredients being such that the whole solution is thoroughly taken up and bound by the powder. The quantity of solution bound by the crystallizing substance is somewhat less than the quantity of fluid matter expelled from said substance by its prior treatment, so that the end product gained is a very solid and dense crystalline mass which is capable of withstanding any atmospheric influence. This results in the practical advantage of the finished preparation and allows the same to be stored for a considerable time without fear of a gradual decay or disintegration of the mass. Moreover I have found that if a radio-active substance is bound in the manner described, the emanations become greater in course of time, a phenomenon probably due to the dense structure of the crystalline mass binding the radium compound.

In order to make my invention more clear, I shall give a specific instance of the preparation of a radium incasement according to my invention:

Carbonate of sodium is first calcined. This calcined product is then mixed with an aqueous solution of a radium compound in the following proportions: To 1 milligram of bromid of radium ($RaBr_2$), dissolved in 1000 cu. cm. of water, 1000 grams of calcined carbonate of sodium are added. Such a mixture forms a white crystalline mass suitable for internal application for medical purposes and at the same time retains the radio-activity of the radium bromid and prevents its conversion into helium. The radio-active substance according to the present invention may be applied internally as a medicine.

Claims.

1. A permanent radio-active crystalline product derived from a radium salt solution and an anhydrous crystalline substance which product forms a uniform crystalline mass and has the property of retaining the radio-activity of the radium therein and avoiding the conversion of said radium into helium.

2. A permanent radio-active crystalline product derived from a bromid or radium solution and anhydrous sodium carbonate which product forms a white crystalline mass suitable for internal application for medical purposes and at the same time retains the radio-activity of the radium bromid therein and avoids its conversion into helium.

3. Process for the production of a permanent radio-active crystalline substance consisting in subjecting the substance containing water of crystallization to heat for the purpose of expelling the said water of crystallization therefrom and mixing the substance thus treated with an aqueous solution of a radium compound the proportion of the solution added being such that its amount is less than the water previously expelled from said crystallizing substance.

In witness whereof I have hereunto set my hand in the presence of two witnesses.

JOHANNES REITZ.

Witnesses:
 HENRY HASPER,
 WOLDEMAR HAUPT.